United States Patent
Schafheutle et al.

(10) Patent No.: US 8,216,358 B2
(45) Date of Patent: Jul. 10, 2012

(54) SELF-CROSSLINKING BINDERS

(75) Inventors: Markus Schafheutle, Graz (AT); Anton Arzt, Neu-Tillmitsch (AT); Susanne Dellinger, Graz (AT); Hannelore Gsoell, Graz (AT)

(73) Assignee: Cytec Austria, GmbH, Werndorf (AT)

( * ) Notice: Subject to any disclaimer, the term of this patent is extended or adjusted under 35 U.S.C. 154(b) by 354 days.

(21) Appl. No.: 12/670,473

(22) PCT Filed: Jul. 24, 2008

(86) PCT No.: PCT/EP2008/059709
§ 371 (c)(1),
(2), (4) Date: Feb. 11, 2010

(87) PCT Pub. No.: WO2009/013336
PCT Pub. Date: Jan. 29, 2009

(65) Prior Publication Data
US 2010/0197856 A1  Aug. 5, 2010

(30) Foreign Application Priority Data
Jul. 25, 2007 (EP) .................................. 07014578

(51) Int. Cl.
*D21H 17/07* (2006.01)
(52) U.S. Cl. ......... 106/287.25; 106/287.23; 106/287.24; 525/186; 525/403; 525/420; 525/437; 525/453; 525/540
(58) Field of Classification Search ............. 106/287.23, 106/287.24, 287.25; 525/186, 403, 420, 525/437, 453, 540
See application file for complete search history.

(56) References Cited

U.S. PATENT DOCUMENTS

| | | | |
|---|---|---|---|
| 5,571,861 | A | 11/1996 | Klein et al. |
| 6,515,042 | B2 | 2/2003 | Kriessmann et al. |

FOREIGN PATENT DOCUMENTS

| | | |
|---|---|---|
| EP | 0332326 B1 | 3/1993 |
| GB | 2386898 A | 10/2003 |
| JP | 62112676 A | 5/1987 |
| WO | WO01/66659 A2 | 9/2001 |
| WO | WO2006/072080 A1 | 7/2006 |

OTHER PUBLICATIONS

Written Opinion of PCT/EP2008/059709.

*Primary Examiner* — David W Wu
*Assistant Examiner* — Robert Jones, Jr.
(74) *Attorney, Agent, or Firm* — Wenderoth, Lind & Ponack, L.L.P.

(57) ABSTRACT

This invention relates to a self-crosslinking binder for coating compositions comprising an aqueously dispersed resinous component A having at least one carbonyl group of the ketone or aldehyde type per molecule, and a component B having at least two hydrazine or hydrazide groups per molecule, and at least one structural unit —$NR^1$—$NR^2$—$CHR^3$—$CHR^4$—NH—$R^5$ (I) where the radicals $R^1$, $R^2$, $R^3$ and $R^4$ are each individually selected from the group consisting of a hydrogen radical, and a linear or branched alkyl radical having from 1 to 10 carbon atoms, $R^3$ and $R^4$ may additionally be selected from the group consisting of aryl and alkylaryl radicals having from 6 to 15 carbon atoms, and from oxy alkyl radicals with from 1 to 10 carbon atoms, where oxy groups may be inserted into the alkyl chain, or at the end of an alkyl chain, and $R^5$ is selected from the group consisting of a hydrogen radical, alkyl radicals which may be linear, branched or cyclic and may have from 1 to 10 carbon atoms, and residues of the formula —$(CH_2)_n$—CO—O—X, where n is an integer of from 1 to 6, and X is the residue of a polyhydric alcohol or phenol, and a process for its preparation.

17 Claims, No Drawings

SELF-CROSSLINKING BINDERS

This application is the U.S. National Phase application of International Application No. PCT/EP2008/059709, filed Jul. 24, 2008 and published in English as WO 2009/013336, which claims benefit of priority from European Patent Application No. 07014578.4, filed Jul. 25, 2007, each of which is incorporated by reference herein in its entirety.

The invention relates to self-crosslinking binders. It further relates to a method of making such self-crosslinking binders, as well as a method of use thereof to prepare coating films.

Self-crosslinking polyurethane dispersions have been described, i. a. in EP 0 649 865 B1. They comprise mixtures of aqueously dispersed keto-functional polyurethane resins and polyhydrazides such as adipodihydrazide.

It has been found that the chemical and mechanical resistances of coating films prepared from such dispersions still need improvement. On the other hand, while self-crosslinking acrylic resins based on carbonyl-functional acrylic dispersions and dihydrazides as crosslinkers (such as those described in EP 0 995 780 B1) lead to fast drying, solvent-free paints that have good chemical resistance, their wetting properties in wood coatings still need to be improved, and the resistance to staining by red wine and coffee is not yet satisfactory. Polyurethane acrylic hybrid systems such as those known from EP 0 332 326 B1 have better wood wetting properties, but their drying time is markedly longer, and these systems usually comprise a coalescing solvent (n-methylpyrrolidone).

It is therefore an object of the invention to provide a coating binder that is self-crosslinking upon drying, with fast drying properties and improved chemical and environmental resistance.

This object has been achieved by providing a self-crosslinking binder for coating compositions as claimed in claim 1.

The invention therefore relates to an aqueously dispersed self-crosslinking binder for coating compositions comprising a resinous component A having at least one carbonyl group of the ketone or aldehyde type per molecule, and a component B having at least two hydrazine or hydrazide groups per molecule, and at least one structural unit of the formula $$-NR^1-NR^2-CHR^3-CHR^4-NH-R^5 \quad (I)$$

where the radicals $R^1$, $R^2$, $R^3$ and $R^4$ are each individually selected from the group consisting of a hydrogen radical, and a linear or branched alkyl radical having from 1 to 10 carbon atoms, $R^3$ and $R^4$ may additionally be selected from the group consisting of aryl and alkylaryl radicals having from 6 to 15 carbon atoms, and from oxyalkyl radicals with from 1 to 10 carbon atoms, where oxy groups may be inserted into the alkyl chain, or at the end of an alkyl chain, and $R^5$ is selected from the group consisting of a hydrogen radical, of alkyl radicals which may be linear, branched or cyclic and may have from 1 to 10 carbon atoms, multivalent aliphatic radicals which are preferably branched and from multivalent cycloaliphatic radicals, each having at least two, and up to six binding sites, and of residues of the formula $$-(CH_2)_n-CO-O-X,$$

where n is an integer of from 1 to 6, and X is the residue of a polyhydric alcohol or phenol having preferably at least two, particularly preferably at least three, and up to six hydroxyl groups.

A further object of the invention is a process to make the said aqueously dispersed self-crosslinking binder by providing a resinous component A having at least one carbonyl group of the ketone or aldehyde type per molecule, which is dispersed in water or in a mixture comprising a mass fraction of at least 30% of water, and reacting a compound B1 having at least two hydrazide or hydrazine groups per molecule, and a polyfunctional aziridine B2 having at least two, preferably at least three, aziridine groups per molecule, preferably in the presence of the aqueous dispersion of the resinous component A.

A hydrazide group shall mean a group of the structure $R-CO-NH-NH_2$, and a hydrazine group shall mean a group of the structure $R-NH-NH_2$, where R stands for any organic residue.

Another object of the invention is the preparation of coating compositions comprising the self-crosslinking binder of claim 1.

The resinous component A is preferably selected from the group consisting of polyurethanes, polyesters, polyesteramides, polyamides, alkyd resins, epoxy resins and vinyl type polymers. The resinous component A is aqueously dispersed. This can be effected in a known manner, by adding emulsifiers to the component A, or to the water or aqueous mixture wherein A is to be dispersed, before or during dispersing A in the aqueous phase. Preferred are mixtures of at least two emulsifiers wherein at least one non-ionic emulsifier and at least one ionic emulsifier is present. Another preferred way of stabilising an aqueous dispersion of the resinous component A is to provide this component A with a sufficient number of hydro-philic groups which may be non-ionic such as groups derived from oligomeric oxyethylene moieties, or, preferably, ionic or ionogenic, that means, groups that dissociate in alkaline aqueous solutions, preferably under generation of anions which are bound to the polymeric chain of the resinous component A.

The resinous component A is characterised by its content of carbonyl groups or the ketone or aldehyde type. It is self-evident that the resins A have to modified by incorporation of suitable comonomers or of other educts (starting materials) that provide the resin A with the carbonyl functional groups needed, viz. aldehyde or ketone groups, as described supra. In the context of the present invention, a carbonyl group of the ketone type is a $>C=O$ group where both remaining bonds of the said carbonyl group carbon atom are bonded to carbon atoms, while a carbonyl group of the aldehyde type has a carbonyl group carbon atom which is bonded to one carbon, and one hydrogen atom. It is especially preferred that these carbonyl groups are linked to the polymer main chain by a sequence of at least two adjacent carbon atoms. This means that the resinous component A preferably comprises a structure of the type

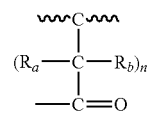

where the wiggly line shall denote the polymer main chain, the residues $R_a$ and $R_b$ may be the same or different in each case and may be hydrogen or less preferred, halogen or lower alkyl of up to four carbon atoms, and n is an integer of at least two. It is also possible to insert an oxygen atom or an oxyalkylene group between the carbon atom forming a part of the polymer main chain, and the at least two carbon atoms in parentheses in the above formula. In a preferred way, there is a carbonyl group pending from the polymer chain as a structure —$CH_2$—$CH_2$—CO—R, where R is preferably methyl or ethyl.

Component A can be any resin containing at least one ketone carbonyl group or aldehyde carbonyl group per molecule that can be dispersed in water or an aqueous phase, either upon addition of at least one emulsifier (so-called external emulsification), or A may be self-emulsifying. Preferably, A is selected from the group consisting of polyurethanes, polyurethane ureas, vinyl polymers, particularly polymers or copolymers of derivatives of acrylic or methacrylic acids such as alkyl esters, hydroxyalkyl esters, and nitriles, where the acids themselves, and styrene and substituted styrenes are preferred as comonomers, and also of polyesters, of alkyd resins, of polyesteramides, and of epoxy resins. Particularly preferred are polyurethanes, vinyl type resins, and polyurethanes or alkyd resins that are grafted or otherwise modified, e.g. by esterification, with acrylic moieties. Also preferred are hybrid polymers comprising polyurethane and/or polyester resins, on one side, and vinyl type polymers, on the other side. These can preferably be synthesised by employing one or more vinyl type monomers, such as styrene or methyl methacrylate, as solvents in the formation of the polyurethane or polyester resins. After formation of the said resins, the mixture is then dispersed in water, the resin acting as emulsifier, and optionally, adding further emulsifier, and then performing an emulsion polymerisation of the vinyl type monomers. It is, within the scope of the present invention, also possible to use mixtures of the resins A having at least one carbonyl group per molecule with other resins A' which are miscible with resins A without phase separation at the usual temperatures of application, preferably of the same chemical class, but do not contain the said carbonyl groups. By "the same chemical class" it is meant that, e.g., both resins are of the epoxy resin type, or both resins are of the alkyd resin, or both resins are of the polyurethane resin type.

It is also possible to use an ester type condensation product as component A which is made by an esterification reaction of a hydrophobic hydroxy-functional resinous compound A1 and a hydrophilic acid-functional resinous compound A2, where ideally at least one molecule of each A1 and A2 are bound together via an ester linkage, and at least one of the resinous compounds A1 and A2 further contains at least one carbonyl functionality. Such resinous compounds A1 and A2 are in turn also selected from the group consisting of polyurethanes, polyesters, alkyds, epoxy resins, and vinyl type polymers having, in turn, hydroxy functionality, and acid functionality, and at least one of A1 and A2 has also a carbonyl functional group.

Polyurethanes are made as is known in the art by reacting oligomeric or polymeric multi-hydroxy functional organic compounds with multifunctional isocyanates, optionally including low molar mass organic multifunctional hydroxy compounds. "Multifunctional" in the context of the present invention refers to compounds having a functionality of at least two. As is also known in the art, self-emulsifying polyurethanes are made by including into the reaction mixture a compound having acid functionality and at least one functional group that is reactive towards isocyanate groups. It is further known in the art that aqueously dispersed polyurethanes are preferably made by synthesising, in the first step, a prepolymer A' having isocyanate functional groups which is the dispersed in an aqueous mixture containing a so-called chain extender A", a compound having at least two groups that react with isocyanate groups faster than does water. On average, at least two of the prepolymer molecules A' react with at least one of the chain-extenders A" in a polyaddition reaction under chain extension, thus forming a higher molar mass polyurethane (or polyurethane urea in the case that A" comprises at least one primary or secondary amino group).

The carbonyl functionality is introduced into the polyurethane within an isocyanate, a polymeric or oligomeric multi-hydroxy compound, an optional low molar mass multifunctional hydroxy compound, or a low molar mass mono-hydroxy or mono-amino functional compound. Similar reactions are used in the case of resinous compounds A having a different chemical character, the carbonyl functional molecule always being chosen such that it comprises at least one carbonyl group, and at least one group by which the link in the polymer main chain between the monomeric moieties is effected. In the case of a vinyl polymer, this can be an olefinically unsaturated aldehyde or ketone, or in the case of an epoxy resin, this can be a diglycidyl ether of an aliphatic or aromatic aldehyde or ketone, such as the diglycidyl ether of dihydroxybenzaldehyde or the diglycidyl ether of dihydroxybenzophenone, by way of example.

Component B having at least two hydrazine or hydrazide groups and at least one structural unit of formula I supra, per molecule, can preferably be made by reacting a compound B1 having at least two hydrazide or hydrazine groups per molecule, and a polyfunctional aziridine B2 having at least two aziridine groups per molecule, preferably in the presence of the aqueous dispersion of the resinous component A.

The polyfunctional aziridine B2 has at least two aziridine groups, a higher degree of crosslinking can be realised by using a polyfunctional aziridine B2 having three or more aziridine groups per molecule.

A process used to prepare the aqueous self-crosslinking binders of the present invention comprises the steps of
a) preparation of a resinous compound A
b) dispersing the resinous compound A in water
c) adding to the dispersion a multifunctional aziridine compound having at least two aziridine groups per molecule, preferably at least three aziridine groups per molecule, and homogenising the resulting mixture,
d) and adding to this mixture a hydrazine or hydrazide functional compound having at least two hydrazine or hydrazide groups per molecule.

It is preferred, in order to achieve a higher degree of crosslinking, to use in this process polyfunctional aziridines B2 that have three or more aziridine groups.

In the case of A being a polyurethane or polyurethane urea, it is preferred that the resinous compound which is added to the water in the second step b) is an isocyanate-functional polyurethane prepolymer A', and that a so-called chain extender molecule A" is added to the water wherein the prepolymer A' is dispersed, before or during dispersion of A', in step b), and A' and A" react in the aqueous medium to form a chain-extended polyurethane or polyurethane-urea A.

If A is a self-emulsifying resin, it is sufficient to disperse the said resin A, preferably under high shear, in water in step b). This can be effected in a known manner by using dispergators commercially available such as a blade stirrer, an impeller stirrer, or an ®Ultra-Turrax.

If A is not a self-emulsifying resin, emulsifying agents are added either to the water used in step b) or to the resin A which is to be dispersed in step b). Commonly used emulsifiers are molecules having both a hydrophilic and a hydrophobic part. These molecules form aggregates in the interfacial layer between the aqueous and non-aqueous phases and stabilise the dispersed droplets in the continuous phase.

Preferred are mixtures of at least two emulsifiers wherein at least one non-ionic emulsifier and at least one ionic emulsifier is present.

In step c), a polyfunctional compound containing at least two hydrazine or hydrazide groups per molecule is added to the dispersion of A in water formed in step b), under stirring so that preferably, a homogeneous mixture is formed. It is also preferred that after this mixing step, the pH of the aqueous mixture is set above a value of 6, more preferred, above 7. The optimum result is obtained if the pH is in a region of from 8.0 to 10.5.

In the fourth step d), the multifunctional aziridine compound is added to the mixture of step c), "multifunctional" meaning here a compound that has at least two aziridine groups per molecule, wherein the ratio of the amount of substance of aziridine groups to the amount of substance of hydrazide-functional molecules is preferably in a range of from 0.8 mol/mol to 1.0 mol/mol, and particularly preferred, from 0.9 mol/mol to 0.99 mol/mol. The ratio of the amount of substance of carbonyl groups in A to the amount of substance of remaining hydrazide and hydrazine groups after step d) has been performed and the reaction has gone to completion, is then preferably from 1.0 mol/mol to 1.5 mol/mol, particularly preferred from 1.05 mol/mol to 1.2 mol/mol.

The range for the ratio of amounts of substance for carbonyl groups in the resinous component A, of hydrazide or hydrazine groups in component B1 and aziridine groups in component B2, before reaction of any of these groups amongst themselves

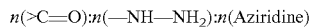

$n(>C=O):n(-NH-NH_2):n(\text{Aziridine})$ is preferably 1 mol:(1.0 mol . . . 2.2 mol):(0.2 mol . . . 1.1 mol), in the case of a trifunctional aziridine and a difunctional hydrazine or hydrazide.

The self cross-linking binders of the present invention can advantageously be used to prepare coating compositions for wood and wood-based materials. They are also suitable for coating of other heat-sensitive materials such as paper and cardboard, as well as leather and textile materials.

In the examples as well as in the preceding text, all physical quantities with the unit "%", or "cg/g", relating to solutions or mixtures are mass fractions (mass of solute or specified component, divided by mass of solution or mixture) unless otherwise stated.

The acid number is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g".

The amine number is defined, according to DIN 53 176, as the ratio of that mass $m_{KOH}$ of potassium hydroxide that consumes the same amount of acid for neutralisation as the sample under consideration, and the mass $m_B$ of that sample, or the mass of solid matter in the sample in the case of solutions or dispersions, the commonly used unit is "mg/g".

EXAMPLES

Example 1

Preparation of a Resinous Component a Based on a Polyurethane

In a three neck vessel equipped with reflux condenser and a dropping funnel, 900 g of castor oil, 156 g of dimethylol propionic acid, 272 g of 3-acetylpropanol, 100 g of neopentyl glycol and 178 g of dipropylene gylcol dimethyl ether were charged and heated under stirring to 120° C. until a homogeneous solution was obtained. 369 g of toluoylene diisocyanate were added slowly to keep the temperature of the reaction mixture under 124° C. When all diisocyanate was added, stirring was continued at a temperature of from 115° C. to 120° C. until the mass fraction of isocyanate groups in the mixture had fallen to less than 0.04%. Then, 632 g of isophorone diisocyanate were added in the same way, and the reaction mixture was again stirred at the said temperature until the mass fraction of isocyanate had again fallen below 0.6%. 59 g of fully desalinated water were added to lower the temperature to about 97° C. Slight foaming was observed. A mixture of 52 g of 25% strength aqueous ammonia solution and of 59 g of water were then added and homogeneously admixed. The neutralised resin solution was then dispersed in 2800 g of fully desalinated water within from thirty to forty-five minutes.

Example 2

Addition of Hydrazide

The resin dispersion of Example 1 was heated under stirring to a temperature of between 70° C. and 80° C. 176 g of adipic dihydrazide were added and the mixture was stirred for thirty minutes until a homogeneous mixture was obtained. This mixture was cooled to room temperature, and filtered through a 25 μm fleece filter to remove any precipitate. The resulting dispersion had an average particle size of 73 nm, a mass fraction of solids of 43%, an acid number of 26.6 mg/g, a dynamic viscosity of 2300 mPa·s and a pH (1 g of the dispersion diluted with 9 g of water) of 7.7. The ratio of the amount of substance of hydrazide groups to the amount of substance of carbonyl groups was 0.8:1.

Example 3

Preparation of Self-Crosslinking Binder 800 g of the dispersion of Example 2 were charged into a vessel. At a temperature of from 25° C. to 30° C., 240 g of a polyaziridine (®CX 100 crosslinker, DSM NeoResins B.V.) were slowly added to keep the temperature below 45° C. The viscosity rose strongly during addition. After completion of the addition, stirring was continued for another hour, whereafter the vessel was left to rest for 15 hours at ambient temperature. During this period, the viscosity declined slowly and steadily. A fine particle dispersion was obtained that was finally filtered through a fleece filter having 25 μm pores. The following data were determined on the resulting dispersion: a dynamic viscosity of 1200 mPa·s, a mass fraction of solids of 45%, an amine number of 12.2 mg/g, and an acid number of 17.7 mg/g. The acid number rose upon storage during one week at ambient temperature to 29.6 mg/g (approximately the starting value, see Example 2).

Example 4

Coating Test

The dispersions of Examples 2 and 3 were used to formulate non-pigmented coating compositions C2 and C3 for wood substrates. As comparative examples, a commercial self-crosslinking polyurethane-acrylic hybrid resin (C4) was used, together with a self-crosslinking coating binder that is based on acrylic copolymers (according to Example 4 of EP 0995780 B1; coating composition C1). In table 1, the composition of the coating agents is listed:

TABLE 1

Coating compositions

| Designation | C1 Example 4 of EP 0995780 B1 | C2 Dispersion of Example 2 | C3 Dispersion of Example 3 | C4 Commercial PUR-Acrylic hybrid resin |
|---|---|---|---|---|
| mass fraction of solids | 43% | 43% | 43% | 35% |
| Binder (see title line) | 100 | 100 | 100 | 100 |
| Defoamer | 0.5 | 0.5 | 0.5 | 0.5 |
| solvent 1 | | 4.0 | 4.0 | |
| solvent 2 | 6.0 | | | 6.0 |
| Thickener | 3.0 | 2.0 | 2.0 | 3.0 |
| Wetting agent | 0.3 | 0.3 | 0.3 | 0.3 |
| Total mass in g | 109.8 | 106.8 | 106.8 | 109.8 |

The following additions were used:
Defoamer: ®Tego-Foamex 805, polyether siloxane copolymer, Degussa AG
solvent 1: mixture of equal mass fractions of butyl glycol (ethylene glycol monobutyl ether) and water
solvent 2: mixture of equal mass fractions of butyl glycol (ethylene glycol monobutyl ether) and butyl diglycol (diethylene glycol monobutyl ether)
Thickener: ®Rheolate 278, 2.5% in aqueous solution, a polyether-urea polyurethane based thickening agent, supplied by Rheox, Inc., Hightstown, NJ, USA
Wetting agent: ®Additol VXW 6503

The coating compositions were prepared by mixing the binders, adding defoamer and solvent, and mixing for ten minutes with a high speed stirrer. Thickener and wetting agent were then added and well mixed for another ten minutes. Further water was then added to adjust the viscosity to an efflux time of thirty seconds (from a DIN 4 cup according to DIN EN ISO 2431). The coating compositions thus prepared were applied to glass plates and maple boards. The following results were obtained:

TABLE 2

Coatings Performance Test

| Coating Composition | C1 | C2 | C3 | C4 |
|---|---|---|---|---|
| mass fraction of solids | 45% | 43% | 43% | 35% |
| Solvent content | none | DPGDME, 3% | | NMP, 6.7% |
| Drying time - dust free | 30 min | 25 min | 26 min | 45 min |
| tack free | 45 min | 40 min | 43 min | >180 min |
| Pendulum Hardness - 24 h | 90 s | 120 s | 115 s | 83 s |
| 7 d | 115 s | 150 s | 147 s | 149 s |
| Resistance on Glass Plates -Acetone | 26 s | 30 s | 60 s | 20 s |
| Ethanol | 110 s | 80 s | 200 s | 180 s |
| Water | 80 min | 8 h | 20 h | 80 min |
| Resistance on Maple Board-Ethanol | 5 | 2...3 | 5 | 5 |
| Domestic Cleaner | 5 | 4 | 5 | 5 |
| Ammonia Solution | 5 | 5 | 5 | 5 |
| Acetone | 5 | 5 | 5 | 5 |
| Water | 5 | 5 | 5 | 5 |
| Soluble Coffee | 3 | 5 | 5 | 4 |
| Red Wine | 3 | 4...5 | 5 | 5 |
| Wood Wetting | poor | very good | very good | very good |

Dust-free and tack-free drying times were measured on a 150 μm thick wet film. Pendulum hardness (König) was measured with 150 μm wet films on glass plates. Such specimens were also used to judge the water and solvent resistances. Maple boards were coated twice with 200 μm wet films, resistance against the agents listed was evaluated after three weeks' drying at room temperature, according to DIN 68861/1. Wood wetting was judged on en empirical basis, on a scale of five ranging from 1=very good to 5=poor.

In comparison to known self-crosslinking coating compositions based on acrylic copolymers (coating composition C1) and urethane acrylic hybrids (coating composition C4), the binders of the present invention show faster drying time, faster hardness development and improved resistance against water and solvents. Although slight variations can be seen, resistance on coated wood panels overall is on par with the systems of the prior art.

Example 5

Preparation of a Resinous Component a Based on an Acrylic Copolymer

An acrylic copolymer containing carboxylic acid and ketone-type carbonyl functionalities was prepared using the monomer mixtures as detailed in table 3.

TABLE 3

Preparation of Carbonyl and Carboxyl Functional Acrylic Copolymers (mass of chemicals in g)

| Ingredient | mass in g |
|---|---|
| fully deionised water | 1108 |
| anionic emulsifier [1] | 7 |
| nonionic emulsifier [2] | 4.4 |
| radical initiator [3] | 2 |
| styrene | 100 |
| acrylic acid | 61 |
| butyl acrylate | 329 |
| diacetone acrylamide | 210 |
| chain transfer agent [4] | 8.4 |

[1] sodium lauryl sulphate (30% solution in water, ®Disponil SDS, Cognis Deutschland GmbH & Co. KG)
[2] mixture of fatty alcohol ethoxylates, ®Disponil A 1080, Cognis Deutschland GmbH & Co. KG
[3] ammonium peroxodisulphate
[4] butyl mercaptopropionate To the acrylic copolymer dispersion prepared as detailed above, 18 g of fully deionised water, 12 g of 25% strength aqueous ammonia solution, 9 g of ®Acticide MBS (microbicide, mixture of methyl-4-isothiazoline and 1,2-benzisothiazolin-3-one, Thor Specialities Ltd.), 108 g of adipic dihydrazide and a further 111 g of fully deionised water were admixed to form a homogeneous dispersion.

This mixture was divided into 4 equal parts, 27 g of adipic dihydrazide were added to the fourth portion (Example 5.4) and homogenised, and different quantities of the polyazridine crosslinker ®CX 100 were then added:

TABLE 4

Preparation of Self-Crosslinking Binders

| Example | 5.1 | 5.2 | 5.3 | 5.4 |
|---|---|---|---|---|
| mass of polyaziridine added | 0 g | 3.75 g | 7.5 g | 15 g |

The homogenised mixtures were applied to glass plates in a wet film thickness of 150 μm each. The films were dried at standard conditions (23° C.; 50% relative humidity) for one week. The acetone resistance was measured by applying a drop of acetone to the coating film and measuring the time when the coating could be removed in a scratch test. The following results were obtained:

TABLE 5

Coating Test Results

| Example | 5.1 | 5.2 | 5.3 | 5.4 |
|---|---|---|---|---|
| $n(>C=O):n(-CO-NH-NH_2)$:n(Aziridine) | 1:1:0 | 1:1:0.25 | 1:1:0.5 | 1:2:1 |
| Acetone Resistance (time in s) | 30 | 33 | 40 | 55 |

The ratio of $n(>C=O):n(-CO-NH-NH_2):n(Aziridine)$ (measured in mol:mol:mol) states how many carbonyl groups, hydrazide groups (two for adipic dihydrazide) and aziridine groups (three for each 1 mol of ®CX-100) are present in the mixture before reaction with each other. 1 mol of hydrazide groups is consumed by reaction with each 1 mol of aziridine groups. In example 5.1, self cross-linking is only effected by the reaction of the ketone carbonyl groups of the acrylic copolymer with the hydrazide groups of adipic dihydrazide. The degree of self cross-linking is on par with the results obtained following the teaching of EP 0 995 780 B1. By addition of the aziridine in example 5.2, a part of the hydrazide groups (25%) is consumed by reaction with the aziridine, which leaves only 75% of the hydrazide groups for reaction with the carbonyl groups in the copolymer. The degree of cross-linking is therefore reduced, but the cross-linking density is increased by formation of an up to trifunctional cross-linker, this leads to a slight overall improvement in solvent resistance. In example 5.3, 50% of the hydrazide groups are consumed by reaction with the aziridine, which leaves still less hydrazide groups for reaction with the carbonyl groups in the acrylic copolymer. Another slight improvement in the solvent resistance can be observed due to the increase in cross-link density which over-compensates the loss in the degree of cross-linking. The best values for both degree and density of cross-linking, however, is observed in example 5.4 when the reaction of the trifunctional aziridine used in the example with the hydrazide can go to completion, but still leaves a stoichiometric amount of hydrazide groups for cross-linking, under formation of a trifunctional chain-extended hydrazide cross-linker which reacts with the copolymer under formation of hydrazone structures. As is illustrated by this example, and supported by the further experiments carried out in the course of the investigations that have led to the present invention, the optimum range for the ratio of amounts of substance for carbonyl groups, hydrazide groups and aziridine groups, before reaction of any of these groups amongst themselves $$n(>C=O):n(-CO-NH-NH_2):n(Aziridine)$$

is 1 mol:(1.0 mol . . . 2.2 mol):(0.2 mol . . . 1.1 mol), preferably,
1 mol:(1.5 mol . . . 2.1 mol):(0.5 mol . . . 1.05 mol), and particularly preferred,
1 mol:(1.8 mol . . . 2.05 mol):(0.5 mol . . . 1.05 mol).

The invention claimed is:

1. A self-crosslinking binder for coating compositions comprising an aqueously dispersed resinous component A having at least one carbonyl group of the ketone or aldehyde type per molecule, and a component B having at least two hydrazine or hydrazide groups per molecule, and at least one structural unit $$-NR^1-NR^2-CHR^3-CHR^4-NH-R^5 \quad (1)$$

where the radicals $R^1$ and $R^2$ are each individually selected from the group consisting of a hydrogen radical, and a linear or branched alkyl radical having from 1 to 10 carbon atoms; $R^3$ and $R^4$ are each individually selected from the group consisting of a hydrogen radical, a linear or branched alkyl radical having from 1 to 10 carbon atoms, aryl and alkylaryl radicals having from 6 to 15 carbon atoms, and from oxyalkyl radicals with from 1 to 10 carbon atoms where oxy groups are optionally inserted into the alkyl chain, or at the end of an alkyl; and $R^5$ is selected from the group consisting of a hydrogen radical, alkyl radicals which are linear, branched or cyclic and have from 1 to 10 carbon atoms, and residues of the formula $-(CH_2)_n-CO-O-X$, where n is an integer of from 1 to 6, and X is the residue of a polyhydric alcohol or phenol.

2. The self-crosslinking binder of claim 1 wherein the resinous component A is selected from the group consisting of polyurethanes, polyesters, polyesteramides, polyamides, alkyd resins, epoxy resins and vinyl polymers.

3. The self-crosslinking binder of claim 2 wherein the vinyl polymers are poly(meth)acrylates or copolymers having a mass fraction of at least 30% derived from (meth)acrylic monomers which are derivatives of acrylic or methacrylic acid.

4. The self-crosslinking binder of claim 1 wherein the resinous component A is a straight chain polymer, and the at least one carbonyl group is within the polymer chain.

5. The self-crosslinking binder of claim 1 wherein the resinous component A is a polymer having at least one branching point per molecule, and at least one chain has a chain length of not more than twenty atoms forming the at last one chain, and the at least one carbonyl group is within the at least one chain having not more than twenty chain forming atoms.

6. The self-crosslinking binder of claim 5 wherein the at least one chain has at least three and not more than fifteen chain forming atoms.

7. The self-crosslinking binder of claim 1 wherein the resinous component A is a polyurethane having at least one chain pendant carbonyl group of the ketone or aldehyde type, where the carbonyl group is separated from the main chain by at least two adjacent carbon atoms.

8. The self-crosslinking binder of claim 1 wherein the resinous component A is a poly (meth)acrylate having at least one chain pendant carbonyl group of the ketone or aldehyde type, where the carbonyl group is separated from the main chain by at least two adjacent carbon atoms.

9. The self-crosslinking binder of claim 1 wherein the resinous component A is a polyester having at least one chain pendant carbonyl group of the ketone or aldehyde type, where the carbonyl group is separated from the main chain by at least two adjacent carbon atoms.

10. The self-crosslinking binder of claim 1 wherein the resinous component A is a reaction product of a hydroxy-functional hydrophobic resinous compound A1 and an acid functional resinous compound A2, at least one of which comprise at least one carbonyl group of the ketone or aldehyde type, and wherein A1 and A2 are linked together via an ester linkage.

11. The self-crosslinking binder of claim 1 wherein the component B has at least two structural units of formula I.

12. The self crosslinking binder of claim 1 wherein the resinous component A is hydrophilically modified by the presence of groups within the said component A which render the said component A self-emulsifying, which groups are selected from the group consisting of oligomeric oxyethylene moieties consisting of at least three consecutive oxyethylene groups, anionic groups and acid groups that form acid anions upon neutralisation with bases, selected from the group consisting of carboxylic, sulphonic, phosphoric and phosphonic acid groups, and cationic groups and groups that form cations upon neutralisation with acids selected from the group consisting of primary, secondary, and tertiary amines, with the proviso that anionic and cationic groups are not simultaneously present in the component A.

13. The self-crosslinking binder of claim 12 wherein the resinous component A is an aqueously dispersed polyurethane, and the hydrophilic modification is effected by the presence of at least three consecutive oxyethylene groups within the polymer chain, or by the presence of the residue of a bishydroxyalkanoic acid within the polymer chain, or by the presence of both.

14. The self-crosslinking binder of claim 12 wherein the resinous component A is an aqueously dispersed poly(meth)acrylate, and the hydrophilic modification is effected by the presence within the polymer chain of a residue of a poly (oxyethylene)-(meth)acrylate having least three consecutive oxyethylene groups, or by the presence within the polymer chain of the residue of an acid-functional olefinically unsaturated monomer, or by the presence of both.

15. The self-crosslinking binder of claim 1 wherein an effective amount of at least one emulsifier C is present, and C is selected from the group consisting of non-ionic, anionic and zwitterionic emulsifiers and mixtures of non-ionic emulsifiers with any of the said anionic and zwitterionic emulsifiers.

16. A process for the preparation of the self cross-linking binders of claim 1 comprising the steps of
   a) preparation of a resinous compound A having ketone or aldehyde type carbonyl groups,
   b) dispersing the resinous compound A in water
   c) adding to the dispersion a hydrazine or hydrazide functional compound B1 having at least two hydrazine or hydrazide groups per molecule, and homogenising the resulting mixture,
   d) and adding to this mixture a multifunctional aziridine compound B2 having at least two aziridine groups per molecule, and reacting this mixture under formation of a component B having at least two hydrazine or hydrazide groups per molecule, and at least one structural unit $$-NR^1-NR^2-CHR^3-CHR^4-NH-R^5 \qquad (I)$$

where the abbreviations $R^1$ to $R^5$ have the same meaning as in claim 1.

17. The process of claim 16 wherein the range for the ratio of amounts of substance for carbonyl groups in the resinous component A, of hydrazide or hydrazine groups in component B1 and aziridine groups in component B2, where B1 is difunctional, and B2 is trifunctional, before reaction of any of these groups amongst themselves, $$n(>C=O): n(-NH-NH_2):n(Aziridine)$$

is 1 mol: (1.0 mol . . . 2.2 mol): (0.2 mol . . . 1.1 mol).

* * * * *